W. Smith,

Feed Rack.

No. 83,561.   Patented Oct. 27, 1868.

Witnesses;
G. A. C. Smith.
J. C. Theaker.

Inventor;
Wilson Smith

By J. C. Theaker
his attorney

WILSON SMITH, OF TOD TOWNSHIP, OHIO.

Letters Patent No. 83,561, dated October 27, 1868.

IMPROVEMENT IN HAY-RACKS.

The Schedule referred to in these Letters Patent and making part of the same.

*To all whom it may concern:*

Be it known that I, WILSON SMITH, of Tod township, in the county of Crawford, and State of Ohio, have invented a new and useful Method of Constructing Mangers with a Self-Adjusting Rack thereon; and I do declare that the following is a full, clear, and exact description of the construction and operation of the same, reference being had to the annexed drawings, making a part of this specification.

The nature of my invention consists in providing mangers with a self-adjusting rack, which is swung inside of the manger on pivots, and thus will save the wasting of hay as the same is consumed in stables by domestic stock.

To enable others skilled in the use and construction of mangers and stables, to make and use my invention, I will proceed to describe its construction and operation.

Figure 2:
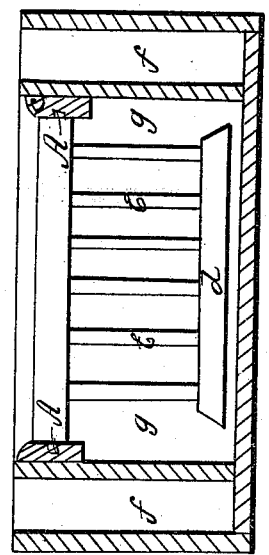
Figure 2 is a separate view of the rack, showing the manner in which it is pivoted.
Figure 1:
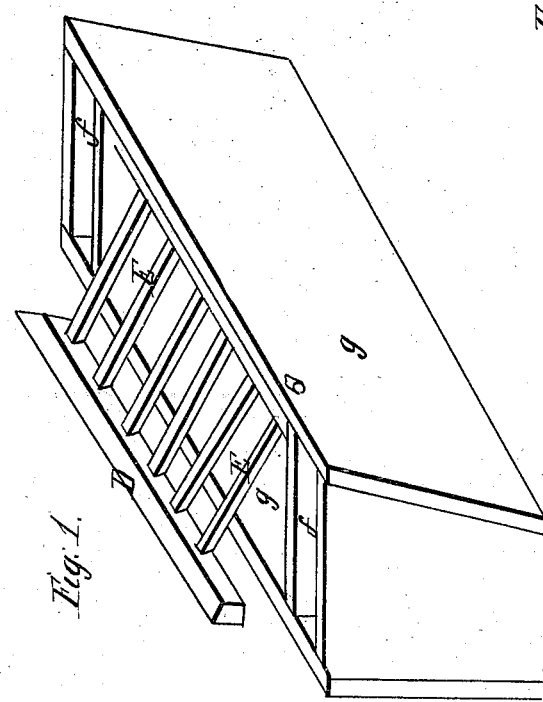
Figure 1 is a perspective view of the manger, with my pivoted rack thereon.

I construct my manger in the ordinary manner for feeding hay to stock; but in order to obviate the waste of hay, by reason of the known habits of horses and cattle pulling out of ordinary mangers, at each mouthful, considerable quantities of hay, which adhere to what they hold in their teeth, and fall down, and become trampled under foot and tainted, so as to be refused by stock in the future, and wasted, I make a rack, as shown in the accompanying drawings, and pivot the lower side piece, *a*, of the same, by constructing it with a round gudgeon or shaft at each end, where it is set loosely into holes at A A, fig. 1, made at the ends of the manger *g*, near the front and upper sides thereof. The rack is constructed with horizontal side pieces *a* and *d*, between which are inserted perpendicular rungs *b b b*, at the proper distance apart to admit the nose of a horse.

The rack, instead of being pivoted, as I have described, may be hinged to the inside of the manger *g*, by ordinary strap-hinges, but for cheapness and convenience, I prefer wooden cleats *c c*, with holes near the front ends thereof, in which to insert the rounded and projecting ends of the lower side piece, and having set said ends in said holes, nail the cleats *c c* to the inside and ends of said manger *g*, as shown in the drawings.

The rack is raised and swung back, so as to open the manger, which is then filled with hay to any desired fulness, the rack swung forward again toward the attendant, if he stand on the opposite side of the manger from the horse, and the horse or other animal has no opportunity to waste the hay, but must pull out a mouthful at a time through between said rungs. As the hay is used, the rack swings down, and continues to rest on the hay, and protect it, until all is used.

At one or both ends of the manger, I place a trough or troughs, *f*, in which to put corn or oats, or any feed other than hay or straw, or such like long feed, and between these troughs, if two are used, or between the trough and the opposite end of the manger, if only one is used, the rack above described is attached and swings.

What I claim as my invention, and desire to secure by Letters Patent, is—

1. The rack, composed of side pieces *a* and *d*, and the rungs or cross-pieces *b b b*, when applied to mangers, by hinging or attaching it to the top of said manger, and at the side next to the animal that feeds therefrom, substantially as shown and described.

2. The combination of manger *g*, the rack *a b b d*, and feed-trough or troughs *f f*, all as shown and described.

WILSON SMITH.

Witnesses:
S. R. HARRIS,
T. H. WIGGINS.